United States Patent [19]

Conley

[11] 4,420,527

[45] Dec. 13, 1983

[54] THERMOSET RELIEF PATTERNED SHEET

[75] Inventor: Kenneth E. Conley, Matthews, N.C.

[73] Assignee: Rexham Corporation, New York, N.Y.

[21] Appl. No.: 295,706

[22] Filed: Aug. 24, 1981

Related U.S. Application Data

[62] Division of Ser. No. 184,240, Sep. 5, 1980.

[51] Int. Cl.³ .................. B32B 3/00; G02B 27/00; B05B 5/00
[52] U.S. Cl. .................. 428/172; 350/167; 427/162; 428/167; 428/337
[58] Field of Search .............. 427/44, 162, 163, 164, 427/165; 264/1; 428/141, 151, 40, 158, 337, 167, 172; 350/167; 430/306, 946

[56] References Cited

U.S. PATENT DOCUMENTS

| | | | |
|---|---|---|---|
| 3,458,348 | 7/1969 | Sherman | 428/409 |
| 3,576,689 | 4/1971 | Uraushihara | 428/167 |
| 3,684,348 | 8/1972 | Rowland | 350/103 |
| 3,689,346 | 9/1972 | Rowland | 156/245 |
| 4,092,173 | 5/1978 | Novak et al. | 427/44 |
| 4,129,628 | 12/1978 | Tamutus | 264/268 |

Primary Examiner—William R. Dixon, Jr.
Attorney, Agent, or Firm—Bell, Seltzer, Park & Gibson

[57] ABSTRACT

The present invention relates to a flexible composite sheet material having a thermoset patterned relief surface of high quality and definition which is particularly useful for producing high quality optical sheet components such as a lenticular screen sheet for producing three-dimensional pictures and photographs. The composite sheet comprises a flexible base film having front and rear surfaces and a layer of a cured thermosetting polymer overlying the front surface of the base film. The cured thermosetting polymer layer has a nonplanar outer surface defining a predetermined desired relief pattern of high quality and durability and of fine definition in the thermosetting polymer layer.

13 Claims, 6 Drawing Figures

4,420,527

THERMOSET RELIEF PATTERNED SHEET

CROSS REFERENCE TO RELATED APPLICATION

This application is a division of U.S. application Ser. No. 184,240, filed Sept. 5, 1980.

FIELD AND BACKGROUND OF THE INVENTION

This invention relates to a relief patterned sheet having optical properties useful in a wide variety of applications, as for example in the production of relatively thin, flexible fresnel lenses, in decorative sheets or laminates having various decorative patterned optical effects, in projection screens, and in lenticular screen sheets of the type which are useful for forming animated display signs or producing three dimensional optical effects.

This type of sheet material is characterized by having a predetermined relief pattern formed in the surface thereof. The particular relief pattern depends upon the intended use of the sheet material. For example, the relief pattern may comprise a series of fine closely spaced lenslike formations designed so as to reflect or refract light in a particular manner for bringing about the desired optical effect.

In order to obtain the desired optical characteristics in this type of sheet material, it is highly important that the relief patterned surface be of high quality and fine definition. Heretofore, in order to achieve the high level of quality and definition needed for this type of sheet material, stamping or embossing by a platen press was the best available manufacturing method. This method involves placing a thermoplastic material in a platen press having an engraved surface corresponding to the desired relief pattern. The platen press is closed and subjected to a heating cycle to heat and soften the thermoplastic material and cause it to conform to the engraved surface of the platen press. The platen press then undergoes a cooling cycle to cool and harden the thermoplastic material so that it will retain its shape and can be removed from the platen press.

Because of the required heating and cooling cycles, the platen press method is necessarily slow and relatively expensive. Additionally, the size of the sheet material is limited by the size of the platen press, and this method is thus not suited for producing a continuous length product.

While other processes are known for producing a relief patterned sheet in continuous length form, the quality and definition of the relief pattern is generally inferior to that obtainable by the platen press method. Typically, such continuous methods utilize an engraved roll and the relief pattern is formed by the roll by embossing the thermoplastic material while in a softened or molten state. Because of the elastic nature of the thermoplastic material and the internal stresses imparted by the embossing roll, the embossed sheet produced by this method has a tendency to try to return to its original flattened and unstressed configuration. Thus, the particular lenslike or other configurations which are formed in the sheet change in shape from their originally desired shape, losing some of their desired optical qualities. Additionally, sheets produced by this method are highly susceptible to streaking during the manufacturing operation as a result of condensation on the sheet during cooling. Also, the sheet is susceptible to dimensional distortion by the embossing machinery unless the roll speeds and web tensions are accurately maintained.

The quality of the relief patterned sheet materials produced by the above-described methods is also limited by the properties of the thermoplastic polymers from which such sheets are formed. For example, these thermoplastic polymers are subject to a number of potentially damaging influences, including staining, solvents damage, abrasion damage, distortion or change in dimension from heat or moisture, and migration of the plasticizers used therein, all of which can undesirably affect the optical qualities of the sheet.

SUMMARY OF THE INVENTION

The present invention provides a sheet material having a patterned relief surface of superior optical and physical properties as compared to the sheets of the above-described prior art. The present invention also overcomes the above-noted problems and disadvantages associated with the relief patterned sheets of the prior art.

These benefits and advantages are achieved in accordance with the present invention by forming the relief pattern in a thermosetting polymer layer. More particularly, sheets produced in accordance with this invention are of a composite construction and comprise a polymeric base film, with a layer of a cured thermosetting polymer overlying one surface of the base film and wherein the patterned relief formations are provided in the cured thermosetting polymer layer.

The cured thermosetting polymer layer has excellent resistance to solvents and abrasion. Further, it is not subject to distortion or change in dimension with heat or moisture content, as is a thermoplastic polymer, nor does it exhibit a tendency to change shape resulting from an elastic memory imparted in producing the relief pattern. Moreover, the cured thermosetting polymer layer is essentially molecularly unoriented and without residual stress. The relief pattern formations are of fine definition and quality and reproduce precisely the configuration of the molding surface from which they are formed. All of this is achieved in accordance with this invention by polymerizing and curing the thermosetting resin in situ while in contact with the molding surface.

More particularly, the relief patterned sheet material of the present invention is formed by applying a coating of the uncured flowable thermosetting resin to one surface of a base film, and then contacting the uncured flowable thermosetting resin coating with a configured molding surface having a series of cavities therein of a configuration for forming the desired patterned relief surface. Pressure is applied to cause the flowable uncured thermosetting resin to fill the cavities of the molding surface, and the thermosetting resin is maintained in contact with the molding surface while the coating is exposed to a curing agent to cause it to cure and harden. Once the coating has been sufficiently cured, it is separated from the molding surface to thus produce a composite sheet having a relief surface of fine definition and quality reproducing precisely the pattern in the molding surface.

In the specific embodiments of the invention illustrated and described more fully hereinafter and in many of the other end use applications for the composite sheet material of this invention, the relief patterned thermosetting polymer layer is adherently and permanently bonded to the base film and the composite sheet material is utilized either in this form or may have additional coating layers or laminations applied thereto. For other end use applications, the composite sheet material may be used as an intermediate product in producing sheet materials with predetermined relief patterns formed in both surfaces thereof. For such applications, the relief patterned thermosetting polymer layer is bonded to the base film with a relatively weak bond strength which permits stripping of the base film from the thermosetting polymer layer for further subsequent processing of the thermosetting polymer layer.

In the preferred form of the invention, the thermosetting polymer layer is an actinic radiation curable resin, and it is cured and hardened by exposing the uncured thermosetting composition to actinic radiation while in contact with the molding surface. For applications in which the base film and/or thermosetting polymer layer is transparent to ultraviolet radiation, a UV curable resin composition may be suitably employed and curing accomplished quite rapidly by exposure to light in the ultraviolet spectrum. For applications in which the base film and/or thermosetting polymer layer is highly pigmented or otherwise substantially opaque to ultraviolet radiation, curing by exposure to electron beam radiation may be preferred.

The composite sheet material of this invention may be used in a wide variety of applications. For example, when provided on one surface with a relief pattern in the form of a series of elongate narrow riblike lenticular formations, the composite sheet material forms a lenticular screen sheet of very high quality and fine definition for providing three dimensional optical effects. When coated with a photographic emulsion, the lenticular screen sheet can be utilized in producing three dimensional photographs. When provided with other configurations of lenticular formations, the composite sheet material can be utilized in forming thin flat fresnel lenses or high quality projection screens. Other relief patterns can provide a sheet having novel optical effects for use in decorative applications.

A highly suitable construction for a lenticular screen sheet in accordance with this invention comprises a flexible optically transparent base film, preferably of a thermoplastic polymer such as polyethylene terephthalate, and an optically transparent coating of an actinic radiation cured thermosetting polymer extending over substantially the entire front surface of the base film and bonded thereto. The thermosetting polymer coating has a nonplanar outer surface defining a series of elongate parallel riblike lenticular formations of narrow width, substantially uniform size and shape, and of fine definition and lenslike quality, each of the lenticular formations having a predetermined focal length correlated with the thickness of the composite lenticular sheet so as to focus substantially at the rear surface of the base film. Preferably, the narrow riblike formations are closely spaced about 100 to 300 per inch.

A further significant feature of the composite sheets of this invention which constriutes to their high quality optical characteristics is the extremely high degree of uniformity in thickness of the composite sheet. The base film used in producing the composite sheet typically has relatively small but measurable variations in thickness due to inherent accuracy limitations in the production of the base film. However, the thickness of the thermosetting polymer layer in the composite sheet compensatingly varies in relation to such variations in thickness of the base film to substantially eliminate variations in thickness in the composite sheet.

BRIEF DESCRIPTION OF THE DRAWINGS

Some of the features and advantages of the invention having been stated, others will become apparent as the description proceeds, when taken in connection with the accompanying drawings, in which.

DESCRIPTION OF ILLUSTRATED EMBODIMENTS

The detailed description which follows and the accompanying drawings illustrate one particular end use application for which the relief patterned composite sheet material is highly suited, i.e. as a lenticular screen sheet for producing three dimensional or stereoscopic effects. From this description, it is believed that persons skilled in this field will readily appreciate that the high quality and fine definition of the relief surface and the other desirable optical and physical properties of the composite sheet material make this sheet material highly useful and advantageous in numerous other end use applications as well, and that appropriate modifications can be made to the particular relief pattern, thicknesses, compositions, and other paramaters specifically described herein in order to render the sheet material suitable for such other end use applications.

Figure 1:
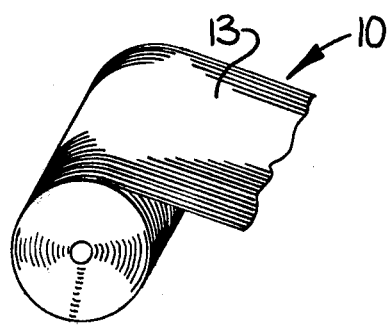
FIG. 1 is a perspective view showing a roll of the composite sheet material of this invention.
Figure 2:
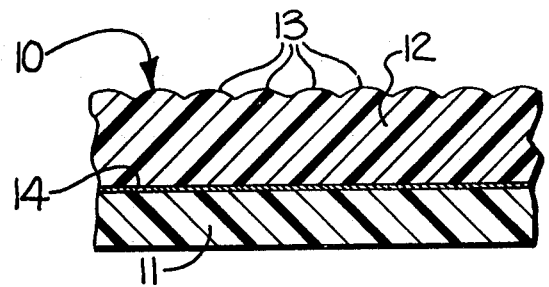
FIG. 2 is an enlarged cross-sectional view of the sheet material.

Referring now more particularly to the drawings, a thin flexible sheet in accordance with the present invention is indicated generally in FIGS. 1 and 2 by the reference character 10. The sheet 10 is of a composite construction and includes a base film 11 having smooth substantially planar front and rear surfaces, with a layer 12 of a cured cross-linked thermosetting polymer overlying the front surface of the base film 11 and bonded thereto. The thermosetting polymer layer 12 is of a variable thickness and has a nonplanar outer surface which defines a relief pattern in the outer surface of the composite sheet in the form of a series of lenticular formations, indicated by the reference character 13.

In the embodiment illustrated, the composite sheet is intended to be optically transparent, and to this end, both the base film 11 and the thermosetting layer 12 are of optically transparent polymer compositions. The lenticular formations 13 are of an elongate parallel riblike form of narrow width and substantially uniform size and shape and extend over substantially the entire front surface of the lenticular screen sheet 10. Each individual lenticular formation 13 or lenticule in the sheet 10 defines an elongate substantially cylindrical lens having a predetermined focal length which is correlated with the thickness of the sheet such that the lens focuses substantially at the rear surface of the base film 11. The focal length is determined by the width and radius of the lenticular formation. Typically, each individual lenticular formation is of a width of about 0.005 to about 0.02 inch so as to provide about 100 to 300 lenses per inch. The corresponding thickness of the composite sheet ranges from about 6 to about 30 mils.

The caliper of the base film may range from about 0.5 to about 10 mils, and preferably from about 4 to about 10 mils. For the particular end use application illustrated herein, the thickness of the base film is less than the overall thickness of the thermosetting polymer layer 12. The base film 11 is preferably of a molecularly oriented thermoplastic polymer having good strength and dimensional stability properties. Examples of materials suitable for use as the base film 11 include triacetate film, vinyl film, vinyl/PET laminates, and polyester films such as polyethylene terephthalate (e.g. Mylar). A molecularly oriented polyester film is the preferred type of film for use as the base film 11 in three dimensional photographic applications because of its excellent strength and dimensional stability properties, good transparency, and the highly uniform caliper which is obtainable in such a film. Additionally, it has been found that excellent bond strengths can be achieved between the polyester base film and the thermosetting polymer layer 12, especially when the surface is coated with adhesion promoter or primer.

Figure 5:
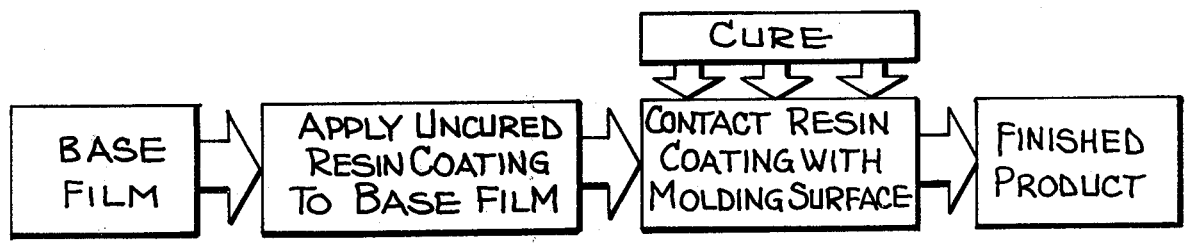
FIG. 5 is a schematic block diagram illustrating a method of producing the composite sheet material of this invention.

The method of making the composite sheet is shown diagramatically in FIG. 5. The thermosetting polymer layer 12 is formed by applying a coating of the thermosetting resin in a flowable uncured state to the front surface of the base film 11 by suitable coating methods, and then contacting the flowable uncured thermosetting resin with a molding surface having the desired lenticular pattern formed therein, and applying sufficient pressure therebetween to cause the flowable resin to uniformly fill the cavities of the molding surface while maintaining the desired coating thickness. The resin is then exposed to a curing agent to cause the resin to harden and cure, rending it shape sustaining and also causing the resin coating to adherently bond to the base film 11. When the molding surface is thereafter separated from the cured coating, the lenticular pattern of the molding surface is accurately reproduced and a composite lenticular screen sheet is thus produced having excellent properties for use in producing three-dimensional or stereoscopic effects. The thermosetting polymer layer can also be formed by applying a coating of the uncured resin directly to the molding surface and then directing the base film onto the coating and curing the resin. The resulting composite sheet has excellent dimensional stability and resistance to solvents, staining and heat. Further, the lenticular formations are an exact reproduction of the molding surface and thus have significantly better definition and lenslike qualities than lenticular formations produced in a thermoplastic sheet by conventional prior art thermal embossing techniques. The fine and accurate definition of the lenticular formations is permanent and stable and does not change with time or as a result of application of heat, as in the lenticular formations which are formed in a thermoplastic resin. In this regard, it will be appreciated that since the resin is cured in situ, there are no stresses imparted to the resin as in an embossing operation and the cured resin layer is thus essentially unstressed and molecularly unoriented. Lenticular sheets produced in this manner also avoid the problem of watermarks from cooling and condensation, which is a significant problem with heat embossed films.

The flowable uncured thermosetting resin may be applied from a solvent system, with the solvent being evaporated prior to curing. It is preferable however, to avoid the handling problems and attendant expense involved in using solvents, and to apply the resin coating in a solvent-free 100 percent solids system.

Thermosetting resin systems suitable for use in forming the transparent outer layer of the composite lenticular screen sheet include a reactive polymer capable of being polymerized under the influence of a curing agent, and a reactive monomer which serves as diluent for the reactive polymer and facilitates control over viscosity. Additionally, the resin system may include a cure initiator, dyes, pigments and conventional additives such as gloss, leveling, flow or wetting agents and adhesion promoters. Curing of the thermosetting resin layer may be carried out by thermal means, using a suitable reactive polymer and monomer system together with a thermal cure initiator such as a peroxide. However, the preferred class of resins for use in the present invention are radiation curable resins, with the curing of the resin being carried out by exposure to a suitable actinic radiation source, e.g. electron beam or ultraviolet light. The radiation source may be directed through the molding surface and into contact with the resin, or from the opposite direction through the base film and into contact with the resin.

Examples of reactive polymers suitable for use in a radiation curable resin system include acrylic based polymers derived from epoxies, urethanes, polyesters, and polyethers. The preferred type of reactive polymer for use in this invention is an acrylated urethane polyester oligomer, such as Uvithane 893, an aliphatic diisocyanate based urethane oligomer having a molecular weight of about 1300, or Uvithane 783, an aromatic diisocyanate based urethane oligomer having a molecular weight of about 1200. These oligomers are products of Thiokol Chemical Division.

The reactive diluent monomer preferably comprises one or more reactive mono-, di- or poly-functional acrylic monomers, examples of which include pentaerythritol triacrylate, trimethylolproprane triacrylate, hexanediol diacrylate, tetraethylene glycol diacrylate, isobornyl acrylate. The acrylic monomers serve as a solvent for the reactive polymer and are added to the polymer in varying amounts to obtain a formulation with the desired viscosity for obtaining the particular coating thickness desired. However, unlike a conventional solvent, these monomers become chemically incorporated into the coating layer by polymerization.

Radiation curing may be accomplished using ultraviolet light or electron beam radiation. Where ultraviolet light is used, the resin formulation should be essentially transparent to ultraviolet light and should include a UV photoinitiator as a curing catalyst for initiating polymerization. Suitable photoinitiators include diethoxyacetophenone, benzil monoxime derivatives, benzil monoketals, benzoin ethers, and benzophenone/tertiary amine. Where electron beam radiation is used for curing, ultraviolet transparency of the resin or the base film is not a factor and no photoinitiator is needed since the electron beam radiation itself forms free radicals capable of initiating polymerization.

To provide enhanced adhesion between the base film 11 and the thermosetting resin layer 12, when such is desired, a primer or adhesion promoter 14 is preferably applied to the front surface of the transparent base film 11 prior to application of the thermosetting resin. Various adhesion promoter compositions are available commercially, and persons familiar with this art can readily select a particular adhesion promoter composition for use in the present invention depending upon the composition of the base film utilized and the particular formulation of the thermo-setting resin. By way of example, where a polyester base film is used, soluble polyester resins have been found to be particularly suitable as adhesion promoters. Typically, these resins are dissolved in a suitable solvent, such as methyl ethyl ketone, and applied to the base film by conventional coating methods, either alone or together with an isocyanate cross-linking agent. Examples of suitable resins include linear saturated polyester resins such as DuPont's 49000 or 49001 or Goodyear's Vitel PE207. Examples of suitable isocyanates include Mondur SH or Mondur HCB, both available from Mobay Chemical Co. For applications where the cured thermosetting layer is to be subsequently stripped from the base film, the resin and/or the surface of the base film may be provided with suitable release agents.

Figure 3:
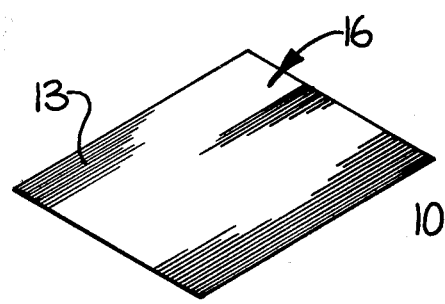
FIG. 3 is a perspective view of a sheet of photographic film produced from a composite lenticular screen sheet in accordance with this invention.
Figure 4:
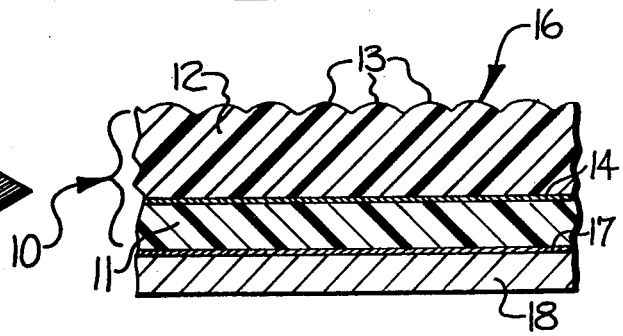
FIG. 4 is an enlarged cross-sectional view of the film material of FIG. 3.

The high quality and fine definition of the lenticular surface produced in accordance with this invention makes the composite sheet highly suitable for use as a lenticular screen sheet in producing three-dimensional pictures or photographs. The composite sheet 10, for example, may be laminated to a printed picture which has been specially processed by methods known in the art, to thus produce a three-dimensional or stereoscopic printed picture. Alternatively, the rear surface of the base film 11 may be coated with a photographic emulsion to produce a photographic film material for use in the production of three-dimensional photographs. In FIG. 3 the reference character 16 generally indicates a composite lenticular screen sheet which has been coated with a photographic emulsion and which is thus useful in producing three-dimensional photographs. As best seen in FIG. 4, this film is formed from the composite sheet 10 shown in FIG. 2. The rear surface of the base film 11 includes a relatively thin coating of a gelatin precoat 17 to render the surface receptive to a photographic emulsion, and a photographic emulsion layer 18 has been applied over the gelatin precoat 17.

Where the composite sheet material of this invention is used as a lenticular screen sheet, uniformity of thickness of the composite sheet is very important since the lenticular formations are designed to focus substantially at the rear surface of the composite sheet and variations in thickness of the composite sheet would alter the focal point of the lenticular formations. In the prior art methods for producing a lenticular screen sheet where two pre-formed sheets are laminated together, it is extremely difficult to obtain uniformity of thickness since the variations in thickness in the respective individual sheets are cumulative when the sheets are laminated together. Similar problems are presented with prior art extrusion coating and casting techniques.

The present invention provides for obtaining a composite sheet of highly uniform thickness, even though the base film used in the laminate may have variations in thickness. This is accomplished by applying a coating of the flowable uncured thermosetting resin to a base film of predetermined thickness and then directing the base film and the applied coating through a metering nip of predetermined width which is greater than the thickness of the base film and which corresponds to the desired overall thickness of the composite sheet. The metering nip serves to control the thickness of the applied coating so that the coating thickness compensatingly varies in relation to the variations in thickness in the base film to thereby substantially eliminate variations in thickness in the composite sheet.

Figure 6:
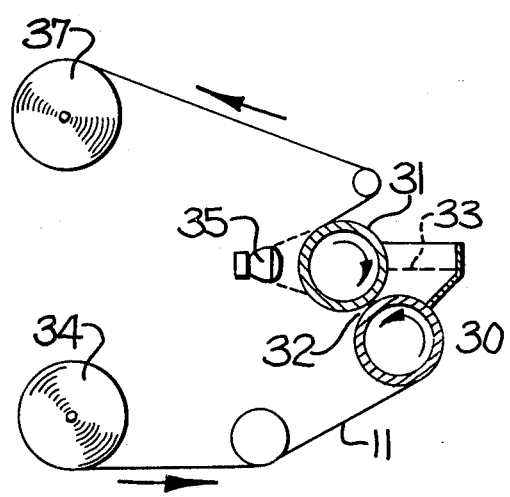
FIG. 6 is a schematic illustration of a preferred arrangement of apparatus for producing the composite sheet material of this invention.

FIG. 6 illustrates a preferred arrangement of apparatus for producing continuously the composite sheet of this invention. As illustrated, the apparatus includes a pair of elongate cylindrical rolls 30, 31 which are mounted along substantially horizontally extending parallel axes with the peripheral surfaces of the rolls positioned in closely spaced relation to one another to form a narrow gap or nip of a width corresponding to the overall desired thickness of the composite sheet. The first roll 30 has a substantially plain smooth surface, while the second roll 31 has a patterned surface with the desired lenticular or other relief pattern formed therein. The rolls 30, 31 are rotated at substantially equal peripheral speeds and in opposite directions of rotation as indicated by the arrows. A reservoir of a flowable UV-curable thermosetting resin is provided above the first roll 30. As illustrated, the base film is advanced from a supply roll 34 and is directed onto the peripheral surface of the first roll 30 and around the peripheral surface of the first roll and then through the narrow nip 32 between the first and second rolls 30, 31. As the film advances around the peripheral surface of the first roll it passes through the reservoir 33 and a coating of the flowable uncured resin is applied to the exposed outer surface of the base film 11. After passing through the nip 32, the base film 32 is directed around the patterned peripheral surface of the second roll 31 with the applied coating of uncured flowable resin being positioned beneath the base film and in contact with the relief patterned surface of the roll 31. While the resin is in contact with the configured surface of the second roll 31, ultraviolet light from lamps 35 is directed through the base film 11 and onto the coating which is in contact with the patterned surface of the second roll. The UV-curable coating is thus hardened and cured into a shape sustaining state and becomes adherently bonded to the base film 11. The base film 11 and thus cured coating is then directed away from the second roll so as to separate the cured coating from the roll and the composite sheet is wound up on a take-up roll 37.

The invention is further illustrated by the following examples, in which all parts and percentages are by weight unless otherwise indicated. These examples are illustrative of certain embodiments of the invention and are designed to teach those skilled in the art how to practice the invention, but are not intended to be understood as limiting the invention.

EXAMPLE 1

A UV-curable resin formulation in a solvent solution was reverse-roll coated onto a 0.0092 inch polyester film and the solvent was evaporated by heat. A plate engraved with a 150 line per inch lenticular pattern was then brought into contact with the coating surface with enough pressure to cause the coating to conform to the lenticular design. This assembly was then passed under a 200 watt/inch mercury ultraviolet lamp at 35 feet per minute to expose the UV-curable coating to ultraviolet light through the polyester film. The plate was then removed, leaving a coated polyester film with a highly accurate reproduction of the engraved plate surface.

EXAMPLE 2

A plate similar to that of Example 1 was coated with an acrylic modified urethane based UV curable resin formulation (Thiokol Chemical Co. formulation ZM 1167) and the coated surface was then nipped against the vinyl side of a 20 mil vinyl/polyethylene terephthalate laminate. This assembly was then cured as in Example 1 by directing ultraviolet light through the laminate. The plate was then removed, leaving a composite film having good bonding between the cured thermosetting resin layer and the vinyl surface and with excellent reproduction of the engraved plate surface.

EXAMPLE 3

A 7 mil Mylar polyester film was coated with a UV-curable resin formulation as set forth in Table I using an apparatus of the type illustrated in FIG. 6. The rolls 30, 31 were rotating at a peripheral speed of 12 feet per minute and were closely positioned with an accurate gap spacing of 20 mils between the two rolls so that a measured amount of coating formulation was metered onto the film through the gap in order to achieve a desired 20 mil overall thickness. The roll 31 was engraved with a 150 line/inch lenticular pattern. The coating formulation was held against this engraved roll by the polyester film while ultraviolet radiation from a 300 watt/inch mercury lamp was directed through the polyester film to cure the coating. The polyester film was then directed away from the engraved roll to separate the cured coating from the roll. The cured coating surface of the resulting composite film had an accurate reproduction of the engraved lenticular patterned roll against which it was cured.

TABLE I

| | A | B | C |
|---|---|---|---|
| | (parts by weight) | | |
| Uvithane 893 Oligomer | 70 | 70 | 100 |
| V-Pyrol | 30 | 10 | — |
| Acrylic Monomer (RC-20) | — | 20 | — |
| 2,2-Diethoxyacetophenone (DEAP) | 2 | 2 | 2 |

In the drawings and specification, there has been set forth a preferred embodiment of the invention, and although specific terms are employed, they are used in a generic and descriptive sense only and not for purposes of limitation.

That which is claimed is:

1. A flexible, composite sheet material having a patterned relief surface of high quality and definition said composite sheet material comprising a flexible base film having opposing front and rear surfaces with the distance therebetween varying over the extent of the base film due to inherent accuracy limitations in the production of said base film and resulting in relatively small but measurable variations in the thickness of the base film, and a continuous coating of a cured thermosetting polymer extending over substantially the entire front surface of said base film and bonded thereto, said coating having a nonplanar outer surface defining a predetermined relief pattern of high quality and durability and of fine definition in said thermosetting polymer layer, the thickness of said cured thermosetting polymer layer in which said relief pattern is formed compensatingly varying in relation to said variations in thickness of said base film so that the distance from the outermost surface portions of the relief pattern to the rear surface of said base film is uniform throughout the sheet material in spite of said variations in thickness of the base film whereby variations in thickness in the overall composite sheet are eliminated.

2. A sheet material as set forth in claim 1 wherein said base film comprises a thermoplastic polymer.

3. A sheet material as set forth in claim 1 wherein said base film comprises a polyester film.

4. A sheet material as set forth in claim 1 wherein said thermosetting polymer coating is adherently and permanently bonded to said base film.

5. A sheet material as set forth in claim 1 wherein said thermosetting polymer coating is bonded to said base film with a relatively weak bond strength permitting subsequent stripping of the base film from the thermosetting polymer layer.

6. A sheet material as set forth in claim 1 wherein said cured thermosetting polymer coating comprises an actinic radiation cured polymer.

7. A sheet material as set forth in claim 6 wherein said actinic radiation cured polymer comprises an acrylated urethane polymer.

8. A sheet material as set forth in claim 6 wherein said actinic radiation cured polymer is substantially transparent to ultraviolet radiation and comprises an ultraviolet radiation cured polymer.

9. A sheet material as set forth in claim 6 wherein said actinic radiation cured polymer is substantially opaque to ultraviolet radiation and comprises an electron beam radiation cured polymer.

10. A sheet material as set forth in claim 1 including an adhesion promoter between the front surface of said base film and said thermosetting polymer coating providing enhanced adhesion between said base film and said thermosetting polymer coating.

11. A sheet material as set forth in claim 1 which is of predetermined, substantially uniform width, of indeterminate length, and in roll form.

12. A flexible composite sheet material having a patterned relief surface of high quality and definition, said composite sheet material comprising a flexible base film of molecularly oriented polyethylene terephthalate having front and rear surfaces and a thickness of about 4 to about 10 mils, and a continuous coating of a thermosetting actinic radiation cured acrylated urethane polymer extending over substantially the entire front surface of said base film, and said coating having a nonplanar outer surface defining a predetermined desired relief pattern of high quality and durability and of fine definition in said coating.

13. A flexible, composite sheet material having a patterned relief surface of high quality and definition, said composite sheet material comprising a flexible optically transparent base film of a thermoplastic polymer, said base film being of predetermined, substantially uniform width and of indeterminate length, and said base film having opposing front and rear surfaces with the distance therebetween varying over the length and width of the base film due to inherent accuracy limitations in the production of said base film and resulting in relatively small but measurable variations in the thickness of the base film, and an optically transparent coating of an actinic radiation cured thermosetting polymer extending over substantially the entire front surface of said base film and bonded thereto, said coating having a nonplanar outer surface defined by a plurality of relief formations forming a predetermined relief pattern of high quality and durability and of fine definition in said thermosetting polymer layer, said relief formations being of uniform size throughout the composite sheet material, and the thickness of said cured thermosetting polymer layer in which the relief formations are formed compensatingly varying in relation to said variations in thickness of said base film so that the distance from the outermost surface portions of the relief formations to the rear surface of said base film is uniform throughout the composite sheet material in spite of said variations in thickness of the base film whereby variations in thickness in the overall composite sheet are eliminated.

* * * * *